United States Patent [19]

Brown

[11] 4,449,352
[45] May 22, 1984

[54] BEAN HARVEST APPARATUS

[76] Inventor: Douglas E. Brown, R.R. #1, Mazon, Ill. 60444

[21] Appl. No.: 422,648

[22] Filed: Sep. 24, 1982

[51] Int. Cl.³ .................... A01D 45/22; A01D 46/00
[52] U.S. Cl. ..................................... 56/13.1; 56/16.5
[58] Field of Search ................ 56/12.8, 12.9, 13.1, 56/13.2, 16.5, 327 R

[56] References Cited

U.S. PATENT DOCUMENTS

| 1,844,750 | 2/1932 | Ellis | 56/13.1 |
| 2,637,965 | 5/1953 | Simpson et al. | 56/16.5 |
| 2,680,338 | 6/1954 | Space | 56/16.5 |
| 2,706,371 | 4/1955 | Bishop | 56/16.5 |
| 3,084,496 | 4/1963 | Leonard et al. | 56/327 R |
| 3,555,790 | 1/1971 | Quick | 56/12.8 |
| 4,035,993 | 7/1977 | Bell et al. | 56/13.1 |
| 4,174,001 | 11/1979 | Ellis | 56/16.5 |
| 4,194,346 | 3/1980 | Ingalls | 56/12.8 |
| 4,282,705 | 8/1981 | Fontan | 56/16.5 |
| 4,364,222 | 12/1982 | Ramacher | 56/12.8 |

FOREIGN PATENT DOCUMENTS

| 2310171 | 9/1974 | Fed. Rep. of Germany | 56/16.5 |
| 867140 | 5/1961 | United Kingdom | 56/12.9 |
| 1580359 | 12/1980 | United Kingdom | 56/12.9 |

*Primary Examiner*—Paul J. Hirsch
*Attorney, Agent, or Firm*—Welsh & Katz, Ltd.

[57] ABSTRACT

The present invention comprises a bean harvesting apparatus mounted on the forward end of a motorized combine. The harvesting apparatus has a housing open along its leading edge for the reception of bean stalks. A power driven cutter bar is provided along the front of the housing which cuts the bean stalks and deposits them into the housing through the opening. A power driven suction apparatus creates a vacuum in the housing which urges the bean stalks upward and into the housing, following cutting. A power driven conveyor belt is disposed longitudinally across the housing. The conveyor belt is sufficiently porous to allow the drawing of a vacuum therethrough. A scraper mechanism scrapes the bean stalks from the conveyor belt, thereby dropping the bean stalks into the bottom of the housing. A power driven auger is disposed near the bottom of the housing which receives the bean stalks dropped from the conveyor belt. The auger feeds the bean stalks into the combine for processing, while an exhaust system vents the air drawn through the housing.

16 Claims, 3 Drawing Figures

BEAN HARVEST APPARATUS

BACKGROUND OF THE INVENTION

The present invention concerns generally the field of crop harvesting apparatus. Commonly known crop harvesting combines include a cutting bar mechanism and reel which cut the crop and throw it onto a conveyor system where it is fed into a combine for threshing and separation from the stalks.

Well known manufacturers of such combines include Massey Ferguson, John Deere and International Havester. Examples of such harvesting apparatus may be seen in the following U.S. Pat. Nos.

| | |
|---|---|
| 1,849,132 | 3,514,928 |
| 2,622,385 | 3,521,710 |
| 2,870,594 | 3,536,140 |
| 3,188,786 | 3,552,398 |
| 3,193,995 | 4,244,165 |
| 3,347,031 | 4,322,940 |
| 3,511,038 | |

U.S. Pat. No. 2,622,385 discloses a string bean picking machine in which the vines of string beans are drawn upwardly by a vacuum source. A pair of seats are provided on each side of the vacuum source so that an individual may hand pick the beans off the vine and drop them onto a conveyor which feeds into a bagging orifice.

U.S. Pat. No. 3,514,928 discloses a bean harvesting machine in which a picking reel, using metal fingers, raises the beans off the ground and separates them from the vine where they are lofted onto a moving conveyor.

U.S. Pat. No. 3,193,995 describes a combine in which the grain is cut by means of cutting blades and blown into a milling machine. The blower directs streams of air towards the grain head receiving mouths which urges the grain heads against the sickle bar.

U.S. Pat. No. 2,870,594 discloses a nut gatherer in which leaves and debris are blown away from the area in front of the device prior to the nuts being gathered by means of a rotating picking wheel. The picking wheel rotates counterclockwise so as to impel nuts on the ground into a conveyor hopper and thus upward into the storage area.

A continuing problem exists however, in that such harvesting apparatus typically leave a fairly substantial amount of stubble and residue unharvested. This material must be plowed back into the ground.

Accordingly, it is an advantage of the present invention to provide a harvesting apparatus which utilizes a vacuum to raise the crop off the ground, thereby harvesting a substantially larger amount of crop, leaving substantially less stubble and residue after harvesting.

SUMMARY OF THE INVENTION

The present invention comprises a bean harvesting apparatus such as a conventional combine having a housing mounted on its forward end. The housing is open along its leading edge for reception of bean stalks. A power driven cutter bar mechanism is provided along the lower leading edge of the housing for cutting the bean stalks and depositing them into the housing. A power driven suction mechanism creates a vacuum within the housing which lifts the bean stalks off the ground and urges them upwardly into the housing. A power driven conveyor belt is disposed longitudinally in the housing. The conveyor belt is porous enough to allow suction to be drawn through and is of the proper size and configuration for receiving the bean stalks as they are drawn into the housing. A scraper bar mechanism is provided near the base of the conveyor belt so that as the bean stalks are drawn onto the conveyor belt, the conveyor belt rotates, thereby moving the bean stalks to the lower portion of the housing where the scraper bar removes them, causing them to drop to the bottom of the housing. A power driven auger is positioned in the bottom of the housing which receives the bean stalks and advances them into the combine. An exhaust mechanism vents air drawn from the housing.

In an alternative embodiment of the invention, the bean harvesting apparatus is mounted on a movable carriage. The housing is substantially coplanar with the surface over which the carriage is to be moved. The intake port in the housing is adapted for reception of the bean stalks. Again, a power driven cutter bar mechanism cuts the bean stalks along the ground. The bean stalks are thereby deposited in the housing through the inlet port. A vacuum source is drawn through the housing, thereby urging the bean stalks upwardly and into the housing through the inlet port. A power driven mesh conveyor belt is disposed along the longitudinal axis of the housing and again, is sufficiently porous to allow the drawing of the vacuum therethrough. A sealing mechanism seals the rear surface of the conveyor belt to the housing, but allows the conveyor belt to be rotated. A pair of power driven rollers extend through the conveyor belt and are arranged horizontally for supporting the conveyor belt and for effecting rotational movement thereof. A power driven roller brush is disposed near the bottom of the conveyor belt which sweeps the beans and bean stalks from the conveyor, thereby allowing the beans and bean stalks to fall to the bottom of the housing. A power driven auger is disposed at the bottom of the housing which conveys the beans and bean stalks from the housing into the combine. An exhaust is provided for allowing air drawn into the housing to be vented.

In an additional alternative embodiment, rather than scraping or brushing the beans and bean stalks from the conveyor belt, a vibrating motor is attached to the conveyor belt. As the bean stalks attach themselves to the conveyor, the conveyor vibrates, thereby dropping the beans and bean stalks to the bottom of the housing.

In a preferred embodiment, the previously mentioned cutter bar mechanism comprises a pair of horizontally disposed cutter bars having shearing teeth along their leading edges. The cutter bars are mounted substantially parallel to each other or closely juxtaposed to each other and are vertical to each other. An eccentric drive mechanism is attached to at least one of the cutter bars which is constructed and arranged to effect horizontal reciprocal motion with the cutter bar, thereby opening and closing the spaces between the shearing teeth of the upper bar and the shearing teeth of the lower bar. As a result, any stalks disposed between the juxtaposed teeth are sheared. A power transmission, such as a belt drive, is provided for effecting rotary motion of the eccentric drive gear. Alternatively, the power drive mechanism may comprise a chain drive connected either to the motor in the combine or to a separate power source.

In a preferred embodiment, the suction mechanism comprises a suction fan disposed in the rear surface of the housing with a belt drive connected to the suction fan. Alternatively, a chain drive may be used.

The power driven conveyor belt comprises mesh steel loops flexibly attached to each other and spaced apart sufficiently to allow vacuum to be drawn therethrough. The sealing mechanism preferably comprises a number of hard rubber pads fixedly attached to the housing in close proximity to the conveyor belt, so as to seal the space between the conveyor belt and the housing, but not retard movement of the conveyor belt. The sealing mechanism prevents passage of debris around the conveyor belt and into the suction mechanism.

In a preferred embodiment, the conveyor belt is driven by a pair of power driven rollers horizontally disposed through the housing. The rollers mechanically engage the mesh conveyor about their periphery in order to move the conveyor. The first roller is disposed near the top of the housing and the second roller is disposed in the bottom of the housing. The conveyor belts are horizontally disposed across the rollers. The rollers, in a preferred embodiment, have a plurality of spikes extending therefrom which fit into the mesh conveyor belt so as to push the beans and bean stalks off of the conveyor at the bottom of the housing. A belt drive attached to the rollers effects rotary motion of the rollers and thereby the conveyor belt.

In a preferred embodiment, the auger comprises a conventional metal shaft having helical blades disposed circumferentially thereabout. A metallic shaft is rotatably mounted within the tubular housing and has attached at its proximal end a belt drive which effects rotary motion of the metal shaft. At the opposite end the auger extends into the housing. The rotation of the auger moves the collected beans and bean stalks in a spiral pattern along the tubular housing into the combine.

In a preferred embodiment, the scraper mechanism comprises one or more brushes or blades extending from the rear of the housing toward the conveyor belt which abrade the conveyor so as to cause the beans and bean stalks disposed thereon to drop to the bottom of the housing.

The bean harvesting apparatus usually includes a plurality of conical projecting from the front of the housing. The conical shape of the crop dividers channels the bean stalks into the cutter bars. Along these lines, an additional feature of the invention are a plurality of transparent viewing appertures disposed about the housing for determining if the mechanism is clogged and for permitting manual correction of the clogging, if desired.

An additional feature of the invention is one or more air deflectors projecting horizontally from the intake portion of the housing. The air deflectors are pivotable so as to control the volume and direction of suction advantageously for drawing bean stalks into the housing.

DETAILED DESCRIPTION OF THE PREFERRED EMBODIMENT

Figure 1:
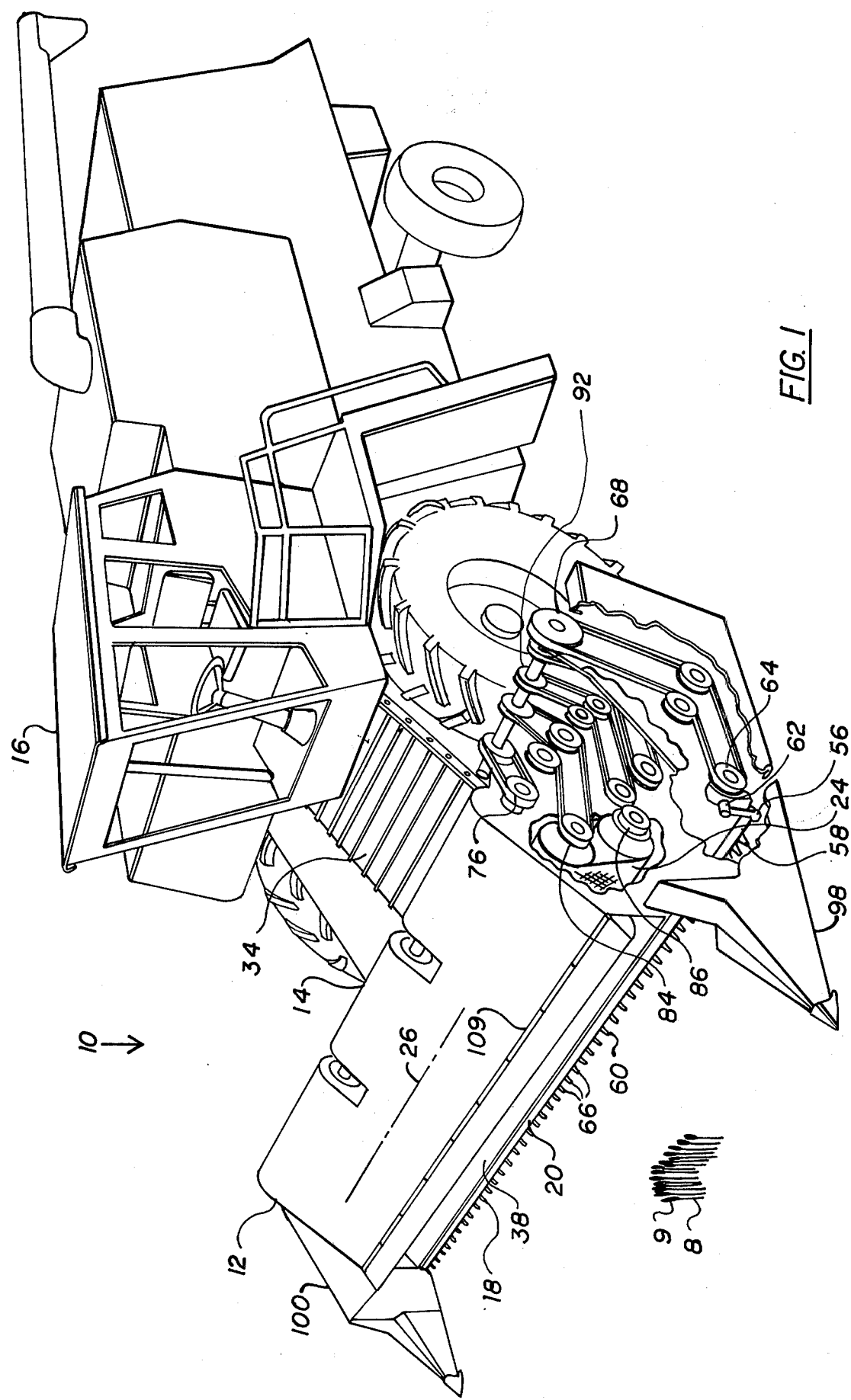
FIG. 1 of the drawings is a front perspective view of a motorized combine having a bean harvesting apparatus of the present invention mounted on its forward end.

While this invention is susceptible of embodiment in many different forms, there is shown in the drawings and will herein be described in detail, several specific embodiments with the understanding that the embodiments illustrated are an exemplification of the principles of the invention and are not intended to limit the invention to the embodiments illustrated.

Figure 2:
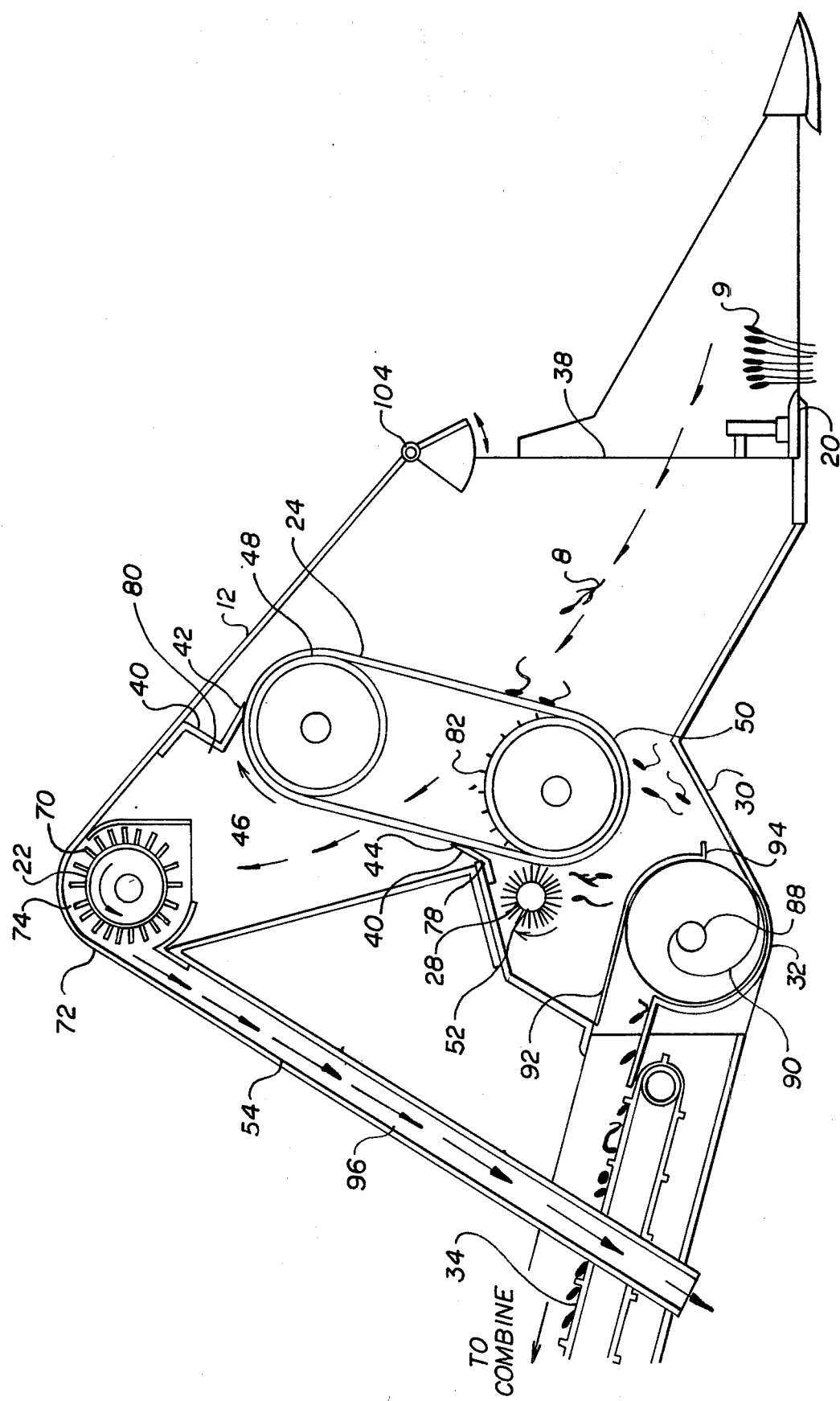
FIG. 2 of the drawings is a side cutaway view of the bean harvesting apparatus of FIG. 1.

As seen in FIG. 1 of the drawings, bean harvesting apparatus 10 comprises a housing 12 mounted on the forward end 14 of a motorized combine 16. Motorized combine 16 is of conventional construction such as Massey Ferguson Model #860 or 850. As best seen in FIGS. 1 and 2, housing 12 is open along its leading edge 18 so as to allow the reception of bean stalks 8 when harvesting. Power driven cutter bar means 20 are provided along leading edge 18 which cut the bean stalks 8 and deposit them into housing 12. Power driven suction means 22, best seen in FIG. 2, create a vacuum within housing 12, thereby urging the bean stalks 8 upwardly into the housing. A power driven conveyor belt 24 is disposed coincident with the longitudinal axis 26 of housing 12. The conveyor belt 24 is sufficiently porous to allow the drawing of a vacuum therethrough by means of suction fan 22. A scraper mechanism 28 (best seen in FIG. 2) is provided for scraping the bean stalks 8 from conveyor belt 24 proximate the bottom 30 of housing 12. Disposed proximate the bottom of housing 12 is a power driven auger 32 which receives the bean stalks 8 and conveys them onto a conveyor 34 which extends to combine 16. In combine 16 the bean stalks 8 are processed conventionally.

Figure 3:
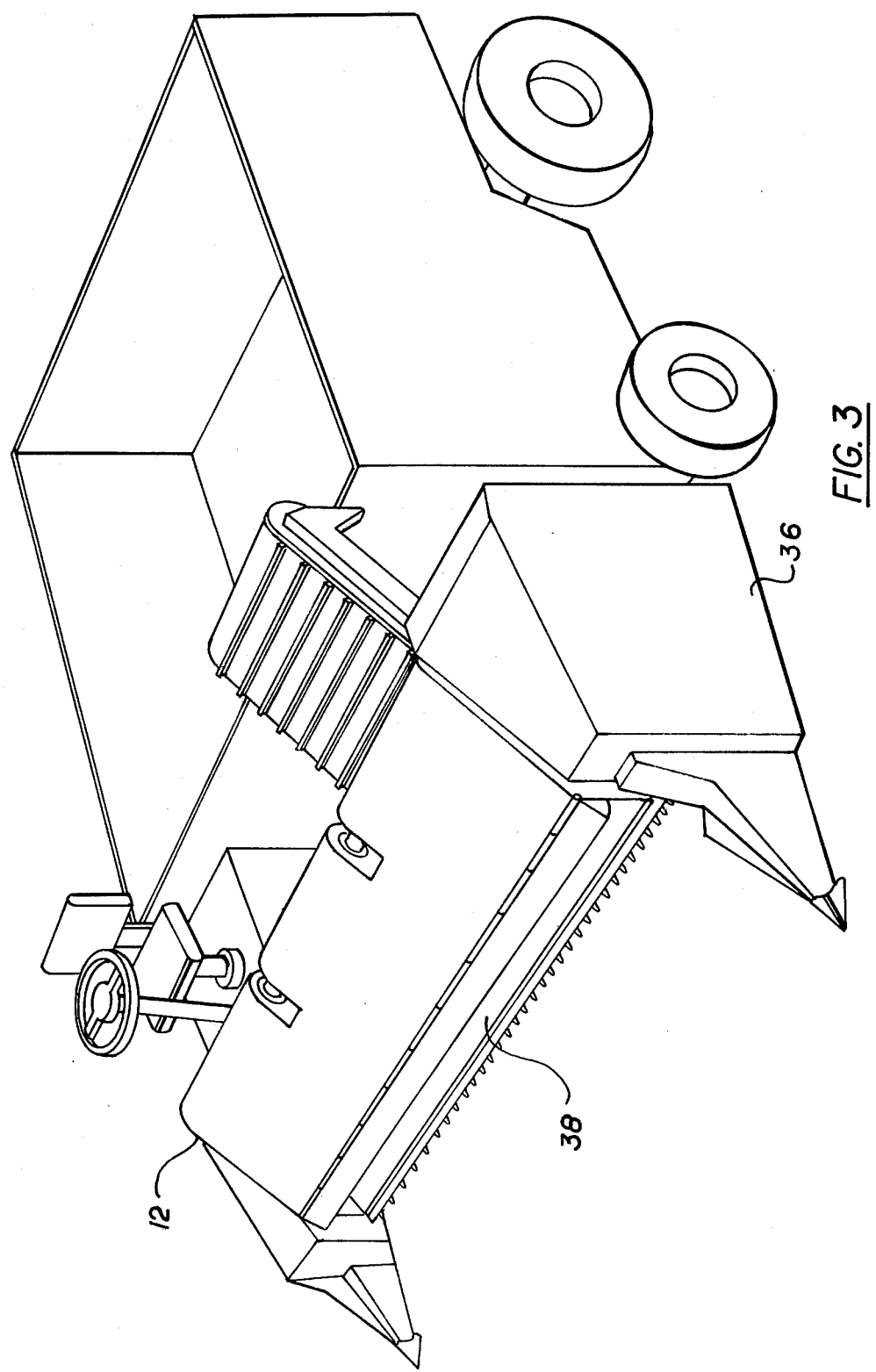
FIG. 3 of the drawings is a front perspective view of an alternative embodiment of a bean harvesting apparatus mounted on a movable carriage.

As best seen in FIG. 3 of the drawings, housing 12 may be mounted on a movable carriage 36. Housing 12 in both FIGS. 2 and 3 is substantially coplanar with the surface over which the carriage 36 or housing 12 is to be moved. An intake port 38 seen in FIGS. 1 through 3 is adapted along leading edge 18 of housing 12 for receiving beans 9 and bean stalks 8. Power driven cutter means 20 are positioned proximate ground level along leading edge 18 and cut bean stalks 8 so as to deposit them through intake 38 and into housing 12. Power driven suction means 22 creates a vacuum in housing 12 so as to urge beans 9 and bean stalks 8 upwardly and into housing 12.

A sealing mechanism 40 is provided for sealing edges 42 and 44 of air path 46 through conveyor belt 24, thereby preventing the drawing of beans 9 and bean stalks 8 around conveyor belt 24 and into suction means 12. A pair of power driven rollers 48 and 50 are spaced apart and arranged horizontally through housing 12 for supporting mesh conveyor belt 24 and for effecting rotational movement of conveyor belt 24. A power driven roller brush 52 is disposed proximate the bottom 30 of housing 12 so as to sweep the beans 9 and bean stalks 8 from conveyor belt 24 and allow them to fall to the bottom of housing 12. Power driven auger 32 (FIG. 2) receives the beans 9 and bean stalks 8 and conveys them from housing 12. Exhaust 54 extends from suction fan 22 and vents air drawn into the housing 12.

Although not seen in the drawings, an additional feature of the invention which may be provided is a conventional vibration motor attached to rollers 48 and 50 which would cause the mesh conveyor belt 24 to vibrate, thereby causing beans 9 and bean stalks 8 to fall from conveyor belt 24 and be deposited into the bottom 30 of housing 24.

Returning to FIG. 1 of the drawings, in a preferred embodiment, power driven cutter means 20 comprises a pair of horizontally disposed cutter bars 56 and 58 having shearing teeth 60 along their leading edge. Mounting means 62 are provided for mounting cutter bars 56 and 58 substantially parallel, closely juxtaposed to and vertically one above the other. An eccentric gear drive 64 is attached, to cutter bar 56 so as to effect horizontal reciprocal (to and fro) motion of cutter bar 56, thereby opening and closing the spaces 66 between shearing teeth 60, thereby shearing any bean stalks 8 disposed between the juxtaposed teeth 60. A power transmission mechanism 68, in this case being a belt drive, is provided for driving eccentric gear 64, thereby effecting rotary motion of eccentric gear 64 and thereby reciprocal motion of horizontal cutter bar 56. Alternatively, a chain drive may be utilized and either a belt or chain drive may be connected to a separate internal combustion engine, if desired.

As best seen in FIG. 2 of the drawings, in a preferred embodiment, suction mechanism 22 comprises a suction fan 70 disposed proximate the rear 72 of housing 12. As shown, suction fan 70 is mounted at the top 74 of housing 12, although this may not always be necessary. As best seen in FIG. 1, a belt drive 76 is connected to suction fan 70 so as to effect rotary motion thereto, thereby creating a vacuum in housing 12 which draws beans 9 into the housing.

In a preferred embodiment, mesh conveyor belt 24 is constructed of flexible steel mesh being sufficiently porous to allow vacuum to be drawn therethrough, but sufficiently fine to prevent the passage of beans 9 or bean stalks 8. Similarly, in a preferred embodiment, sealing mechanism 40 comprises two or more hard rubber pads fixedly attached to housing 12 and abrading against conveyor belt 24 along edges 42 and 44 so as to seal passages 78 and 80 from the passage of debris around conveyor belt 24 and thereby into suction means 22.

As further seen in FIG. 2, rigid rollers 48 and 50 are horizontally disposed in housing 12 and are mechanically engaged about their periphery with mesh conveyor belt 24. First roller 48 is disposed near the top of housing 12 and second roller 50 is disposed near the bottom of housing 12. A plurality of spikes 82 extend from roller 50 and roller 48 (if desired) so as to push the beans 9 and bean stalks 8 off conveyor 12, allowing them to fall to the bottom 30 of housing 12 and into auger 32. As best seen in FIG. 1, a belt drive 84 powers first roller 48 and a second belt drive 86 powers second roller 50.

Returning to FIG. 2 of the drawings, in a preferred embodiment, power driven auger 32 comprises a metal shaft 88 having a helically disposed blade 90 circumferentially thereabout. Metallic shaft 88 is rotatably mounted within a tubular housing 90 extending into housing 12. A belt drive 92 (FIG. 1) is connected to auger 32 so as to effect rotary motion thereof. As a result, beans 9 and bean stalks 8 deposited into tubular housing 90 are mechanically moved from first end 94 of auger 32 onto conveyor 34.

As further seen in FIG. 2, exhaust mechanism 54 is provided to vent air drawn into housing 12. Exhaust 54 is positioned rearwardly of suction means 22 and comprises a hollow tube 96 extending away from housing 12.

As a further note, in an alternative embodiment of the invention, scraper mechanism 28 may comprise a simple blade extending from the rear 72 of housing 12 toward conveyor belt 24 for abrading conveyor belt 24, thereby causing beans 9 and bean stalks 8 to drop from conveyor belt 24 to the bottom 30 of housing 12.

As best seen in FIG. 1, in a preferred embodiment, housing 24 further includes two or more conically shaped crop dividers 98 and 100 which project from the front 18 of housing 12 and channel beans 9 and bean stalks 8 into cutter bars 20. As best seen in FIGS. 1 and 2, an adjustable air deflector 102 is provided along upper edge 104 of leading edge 38 of housing 12. Air deflector 102 projects from intake port 38 so as to direct the suction from housing 12 and thereby direct the angle at which bean stalks 8 are drawn into housing 12.

The foregoing description and drawings merely explain and illustrate the invention, and the invention is not so limited thereto, except insofar as those skilled in the art who have the disclosure before them are able to make modifications and variations therein without departing from the scope of the invention.

What is claimed is:

1. A bean harvesting apparatus comprising a housing mounted on the forward end of a motorized combine; said housing being open along its leading edge for the reception of bean stalks;
   - power driven cutter means for the cutting of said bean stalks and thereby the deposition of said bean stalks in said housing;
   - power driven suction means for creating a vacuum in said housing means, thereby urging said bean stalks upwardly and into said housing;
   - a power driven conveyor belt disposed coincident with the longitudinal axis of housing; said conveyor belt being sufficiently porous to allow the drawing of a vacuum therethrough;
   - scraper means for scraping said bean stalks from said conveyor belt proximate the bottom thereof, thereby dropping said bean stalks into the bottom of said housing;
   - power driven auger means disposed proximate the bottom of said housing for the conveyance of said beans and bean stalks from said housing to said combine; and
   - exhaust means for the venting of air drawn into said housing by said suction means.

2. A bean harvesting apparatus comprising:
   - a housing mounted on a movable carriage and substantially coplanar with the surface over which the conveyor is to be moved;
   - an intake port in said housing adapted for reception of bean stalks;
   - power driven cutter means for cutting of said bean stalks and thereby the deposition of said bean stalks in said housing;
   - power driven suction means for creating a vacuum in said housing means, thereby urging said bean stalks upwardly and into said housing;
   - a power driven mesh conveyor belt disposed coincident with the longitudinal axis of said housing, said conveyor belt being sufficiently porous to allow the drawing of a vacuum therethrough;
   - sealing means for sealing the rear surfaces of said conveyor belt so as to prevent the drawing of beans and stalks into said suction means;
   - a plurality of power driven roller means spaced apart and arranged horizontally for supporting said mesh conveyor belt, and for effecting rotational movement of said conveyor belt;

power driven roller brush means disposed proximate the bottom of said conveyor belt means for the sweeping of beans and bean stalks from said conveyor belt, thereby allowing said beans and bean stalks to fall to the bottom of said housing;

power driven auger means disposed proximate the bottom of said housing for the conveyance of said beans and bean stalks from said housing; and exhaust means for the venting of air drawn into said housing by said suction means.

3. A bean harvesting apparatus comprising;

a housing mounted on the forward end of a motorized combine; said housing being open along its leading edge for the reception of bean stalks;

power driven cutter means for cutting of said bean stalks and thereby the deposition of said bean stalks in said housing;

power driven suction means for creating a vacuum in said housing means, thereby urging said bean stalks upwardly and into said housing;

a power driven conveyor belt disposed coincident with the longitudinal axis of housing; said conveyor belt being sufficiently porous to allow the drawing of a vacuum therethrough;

power driven vibrator means for oscillating said conveyor belt so as to cause said bean stalks to drop to the bottom of said housing;

power driven auger means disposed proximate the bottom of said housing for the conveyance of said beans and bean stalks from said housing; and exhaust means for the venting of air drawn into said housing by said suction means.

4. The bean harvesting apparatus as disclosed in claim 1 or 2 or 3 wherein said power driven cutter means comprises:
a pair of horizontally disposed cutter bars having shearing teeth along their leading edge;
mounting means for mounting said cutter bars substantially coplanar juxtaposed to and vertically from each other;
an eccentric gear drive attached to at least one of said cutter bars construed and arranged to effect horizontal reciprocal motion thereof, thereby opening and closing the spaces between the shearing teeth of the upper bar and the shearing teeth of the lower bar, thereby shearing any stalks disposed between the juxtaposed teeth; and
power transmission means for effecting rotary motion to said eccentric gear means.

5. The bean harvesting apparatus as disclosed in claim 4 wherein said power transmission means comprises a belt drive connected to a rotary pulley driven by conventional means.

6. The bean harvesting apparatus as disclosed in claim 4 wherein said power transmission means comprises a belt or chain drive connected to a rotary pulley driven by an internal combustion engine.

7. The bean harvesting apparatus as disclosed in claim 1 or 2 or 3 wherein said power driven suction means comprises a suction fan disposed proximate the rear surface of said housing; and a belt drive connected to said suction fan.

8. The bean harvesting apparatus as disclosed in claim 1 or 2 or 3 in which said power driven conveyor belt comprises a mesh of steel loops flexably attached to each other and being of a size sufficiently porous to allow the drawing of a vacuum therethrough.

9. The bean harvesting apparatus as disclosed in claim 2 in which said sealing means for sealing the rear surfaces of said conveyor belt comprises a plurality of hard rubber pads fixedly attached to said housing and in close proximity to said conveyor belt so as to seal the space between said conveyor belt and said housing, thereby preventing the passage of debris around the said conveyor belt and into said suction means.

10. The bean harvesting apparatus as disclosed in claim 2 in which said power driven roller means comprises a pair of horizontally disposed rigid rollers mechanically engaged about their periphery with said mesh conveyor belt, a first roller means being disposed proximate the top of said housing and a said roller means being disposed adjacent the bottom of said housing so as to position said mesh conveyor belt horizontally across said housing from the top to adjacent the bottom thereof, said roller means having a plurality of spikes extending therefrom constructed and arranged to extend through said mesh conveyor belt so as to push beans and bean stalks off the said conveyor belt, thereby allowing them to fall to the bottom of said housing and into said auger; and belt drive means attached to said roller means for effecting a rotary motion of said roller means and thereby said mesh conveyor belt.

11. The bean harvesting apparatus as disclosed in claim 1 or 2 or 3 in which said power driven auger means comprises a metal shaft having a helically disposed blade disposed circumferentially thereabout, said metalic shaft being rotatably mounted within a tubular housing and having attached thereto at a first end a belt drive so as to effect rotary motion thereof whereby beans and bean stalks deposited into said tubular housing are mechanically moved from a first end of said auger to an exit therefrom.

12. The bean harvesting apparatus as disclosed in claim 1 or 2 or 3 in which said exhaust means comprises a vent port proximate the rear of said housing and positioned rearwardly of said suction means so as to allow the venting of air drawn into said housing.

13. The bean harvesting apparatus as disclosed in claim 1 wherein said scraper means comprises one or more blades extending from the rear of said housing toward said conveyor belt for abrading said conveyor belt so as to cause the beans and bean stalks disposed thereon to drop to the bottom of said housing.

14. The bean harvesting apparatus as disclosed in claim 1 or 2 or 3 and further comprising a plurality of conical crop dividers projecting from the front surface of said housing, constructed and arranged for channeling bean stalks into said cutter bars.

15. The bean harvesting apparatus as disclosed in claim 1 or 2 or 3 and further comprising a plurality of transparent covered viewing apertures disposed about said housing for visual determination of clogging of the housing, and for permitting manual correction of said clogging.

16. The bean harvesting apparatus as disclosed in claim 1 and further comprising adjustable air deflector means projecting horizontally from the intake port of said housing, said air deflector being pivotable so as to control the volume of suction and the angle at which bean stalks are drawn into said housing.

* * * * *

UNITED STATES PATENT AND TRADEMARK OFFICE
CERTIFICATE OF CORRECTION

PATENT NO. : 4,449,352
DATED : May 22, 1984
INVENTOR(S) : Douglas E. Brown

It is certified that error appears in the above-identified patent and that said Letters Patent is hereby corrected as shown below:

Column 5, line 65, delete "into" and insert - -from- -.

Column 6, line 64, delete "rear surfaces" and insert - -edges of- -.

Column 6, line 66, after the words "and stalks" insert the words - -around said conveyor belt and- -.

Column 7, line 67, change "flexably" to - -flexibly- -.

Signed and Sealed this

Eighteenth Day of June 1985

[SEAL]

Attest:

DONALD J. QUIGG

*Attesting Officer*     *Acting Commissioner of Patents and Trademarks*